United States Patent
Terugu et al.

(10) Patent No.: US 8,902,062 B2
(45) Date of Patent: Dec. 2, 2014

(54) SYSTEMS AND METHODS FOR DETECTION OF DEVICE DISPLACEMENT AND TAMPERING

(75) Inventors: VenkataChalapathi Terugu, Bangalore (IN); Vinayak Sadashiv Kore, Bangalore (IN); Andrew G. Berezowski, Wallingford, CT (US)

(73) Assignee: Honeywell International Inc., Morristown, NJ (US)

(*) Notice: Subject to any disclaimer, the term of this patent is extended or adjusted under 35 U.S.C. 154(b) by 391 days.

(21) Appl. No.: 13/014,918

(22) Filed: Jan. 27, 2011

(65) Prior Publication Data

US 2012/0194339 A1    Aug. 2, 2012

(51) Int. Cl.
| | |
|---|---|
| G08B 1/08 | (2006.01) |
| G08B 17/10 | (2006.01) |
| B60K 28/12 | (2006.01) |
| B60L 9/00 | (2006.01) |
| G06F 7/70 | (2006.01) |
| H04W 52/02 | (2009.01) |

(52) U.S. Cl.
CPC ................. H04W 52/0251 (2013.01)
USPC ....... 340/539.31; 340/3.1; 340/628; 340/505; 340/507; 340/5.31; 180/282; 180/283; 701/22; 701/41; 701/50; 701/58; 701/109

(58) Field of Classification Search
CPC ...... B60K 28/14; F02D 41/042; B62D 37/00; G10H 3/186; G10H 1/0558; G06F 1/1616; H04M 1/6016

USPC ............. 340/628, 539.31, 3.1, 506, 507, 505, 340/10.1, 539.1, 825.36, 825.49, 531; 180/282, 283; 701/41, 50, 109, 22, 58
See application file for complete search history.

(56) References Cited

U.S. PATENT DOCUMENTS

| | | | | |
|---|---|---|---|---|
| 6,030,099 | A * | 2/2000 | McDermott | 362/276 |
| 6,198,394 | B1 * | 3/2001 | Jacobsen et al. | 340/573.1 |
| 6,621,411 | B2 * | 9/2003 | McCarthy et al. | 340/425.5 |
| 6,838,688 | B2 * | 1/2005 | Aoki | 250/559.29 |
| 6,850,843 | B2 * | 2/2005 | Smith et al. | 701/32.2 |
| 7,126,467 | B2 * | 10/2006 | Albert et al. | 340/521 |
| 7,352,198 | B2 * | 4/2008 | Nayak et al. | 324/750.22 |
| 7,528,711 | B2 * | 5/2009 | Kates | 340/506 |
| 7,598,878 | B2 * | 10/2009 | Goldreich | 340/573.1 |
| 7,675,414 | B2 * | 3/2010 | Ray | 340/539.26 |
| 8,085,144 | B2 * | 12/2011 | Appelt et al. | 340/539.11 |
| 2008/0306706 | A1 * | 12/2008 | Markovic | 702/141 |
| 2010/0176952 | A1 * | 7/2010 | Bajcsy et al. | 340/573.1 |

* cited by examiner

Primary Examiner — Daniel Wu
Assistant Examiner — Mancil Littlejohn, Jr.
(74) Attorney, Agent, or Firm — Husch Blackwell LLP (57) ABSTRACT

A method for determining the displacement of or the tampering with a device is provided. The method includes determining an effective displacement in an X direction of a device, determining an effective displacement in a Y direction of the device, and determining an effective displacement in a Z direction of the device. The method also include determining if any one of the effective displacement in the X direction, the effective displacement in the Y direction, or the effective displacement in the Z direction is greater than a predetermined threshold, and when at least one of the effective displacement in the X direction, the effective displacement in the Y direction, and the effective displacement in the Z direction is great then the predetermined threshold, determining that the device has been displaced.

7 Claims, 6 Drawing Sheets

SYSTEMS AND METHODS FOR DETECTION OF DEVICE DISPLACEMENT AND TAMPERING

FIELD

The present invention relates generally to alarm systems. More particularly, the present invention relates to systems and methods for detecting the displacement of and tampering with a device in an alarm system.

BACKGROUND

Alarm systems are known in the art. For example, an alarm system can include a fire detection system or a life safety system. Wireless alarm systems throughout the world require monitoring for integrity and reporting tampering with individual devices in the system.

Specifically, for fire detection systems, section 62.2.1 of the Ninth Edition of UL (Underwriters Laboratories) 864 requires that removal of an initiating device transmitter from its installed location shall cause the immediate transmission of a tamper signal. Accordingly, wireless sensor devices employed in known fire detection systems have been equipped with systems to detect the displacement of the wireless device from an intended mounting location.

To achieve compliance with industry requirements, known alarm systems typically mount wireless sensing devices to a permanently fixed object. For example, many known alarm systems use screws to mount a wireless sensing device to grid work supporting removable ceiling tiles rather than to a ceiling tile itself. The wireless sensing device is equipped with an electromechanical limit switch that detects the removal of the cover over the mounting hardware within the device. However, the use of electromechanical devices adds additional cost as well as engineering design time.

In known alarm systems, the placement of the wireless sensing device is restricted, for example, to the grid work. However, the ideal placement of a sensing device may instead be on a ceiling tile for esthetic reasons or for a variety of environmental reasons. For example, it may be preferable to keep the sensing device away from an air duct, in the center of a space, or away from metallic objects. In architecturally significant or historical structures, the use of damaging mounting devices, such as deep screws, may be restricted.

There is thus a continuing, ongoing need for low-cost systems and methods that eliminate mounting restrictions of wireless sensing devices in an alarm system. Preferably, such systems and methods use acceleration vector analysis and filter algorithms, radio frequency triangulation, acoustic ultrasonic ranging, and/or light ranging to detect the displacement of a device or the tampering therewith.

DESCRIPTION OF THE PREFERRED EMBODIMENTS

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include low-cost systems and methods that eliminate mounting restrictions of wireless sensing devices in an alarm system. Preferably, such systems and methods can use acceleration vector analysis and filter algorithms, radio frequency triangulation, acoustic ultrasonic ranging, and/or light ranging to detect the displacement of a device or the tampering therewith.

In accordance with the present invention, wireless sensing devices in an alarm system can be placed anywhere as would be desired by one of ordinary skill in the art. For example, a wireless sensing device can be placed on a removable ceiling tile.

Vibration and jarring of a structure are generally indistinguishable from displacement unless systems and methods are employed to distinguish between displacement and nuisance. Accordingly, in some embodiments of the present invention, acceleration vector analysis and filter algorithms can be used to detect the displacement of a wireless sensing device from its intended mounting location while treating other kinds of motion as noise. That is, acceleration can be measured within predetermined parameters to establish movement of an installed wireless sensing device. Vibration from, for example, cyclical background noise of motors, vehicles, and acoustic signals, and momentary transient events, for example, jarring and seismic activities, can be treated as noise.

The cost for accelerometers has been historically high, and the power consumption required for acceleration measurement and vector analysis has been high for use in battery powered wireless devices. However, trends in the industry are such that cost and power consumption for accelerometer technology are declining and are expected to continue to do so. Therefore, systems and methods in accordance with the present invention can be employed in a cost-effective manner, even in battery powered applications, by minimizing battery consumption.

Figure 1:
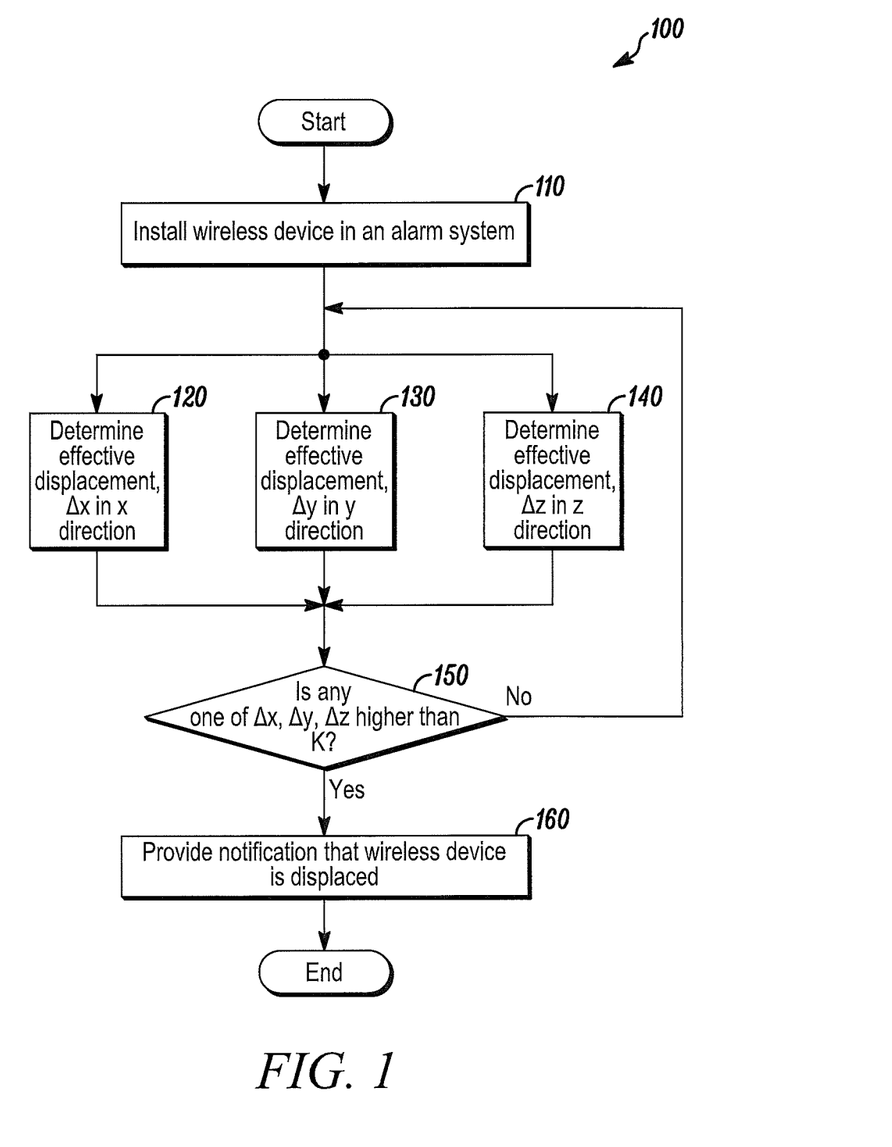
FIG. 1 is a flow diagram of a method of detecting displacement of a wireless device in accordance with a first embodiment of the present invention.

FIG. 1 is a flow diagram of a method 100 of detecting displacement of a wireless device in accordance with a first embodiment of the present invention. In the method 100, a wireless device can be installed in an alarm system as in 110. Then, the effective displacement of the device in the x direction, $\Delta x$, can be determined as in 120, the effective displacement of the device in the y direction, $\Delta y$, can be determined as in 130, and the effective displacement of the device in the z direction, $\Delta z$, can be determined as in 140. In embodiments of the present invention, the effective displacements $\Delta x$, $\Delta y$, and $\Delta z$ can be determined substantially simultaneously.

Δx can be defined as:

$$\Delta x = \left| \frac{1}{n+1} \sum_0^n Dxn \right|$$

And Dx can be defined as:

$$Dx = \frac{(X)-(-X)}{2} \text{units}$$

Where X is the displacement of the device in the positive X direction, –X is the displacement of the device in the negative X direction, Δ is the displacement at any given time interval, and n is the number of samples for the integration interval.

Similarly, Δy can be defined as:

$$\Delta y = \left| \frac{1}{n+1} \sum_0^n Dyn \right|$$

And Dy can be defined as:

$$Dy = \frac{(Y)-(-Y)}{2} \text{units}$$

Where Y is the displacement of the device in the positive Y direction, –Y is the displacement of the device in the negative Y direction, Δ is the displacement at any given time interval, and n is the number of samples for the integration interval.

Δz can be defined as:

$$\Delta z = \left| \frac{1}{n+1} \sum_0^n Dzn \right|$$

And Dz can be defined as:

$$Dz = \frac{(Z)-(-Z)}{2} \text{units}$$

Where Z is the displacement of the device in the positive Z direction, –Z is the displacement of the device in the negative Z direction, Δ is the displacement at any given time interval, and n is the number of samples for the integration interval.

In embodiments of the present invention, n can be determined based on the event decision interval and the sensing frequency of the device. n can vary according to the alarm system and environment in which the device is employed.

After the effective displacements Δx, Δy, and Δz are determined in 120, 130, and 140, respectively, the method 100 can determine if any of Δx, Δy, or Δz is higher than K as in 150. K can be a predefined displacement threshold and can be considered as an event.

If none of Δx, Δy, or Δz is higher than K, then the method 100 can continue to determine the effective displacements Δx, Δy, and Δz as in 120, 130, and 140, respectively. However, if any of Δx, Δy, or Δz is higher than K, then a notification can be provided that the wireless device has been displaced as in 160.

Figure 2:
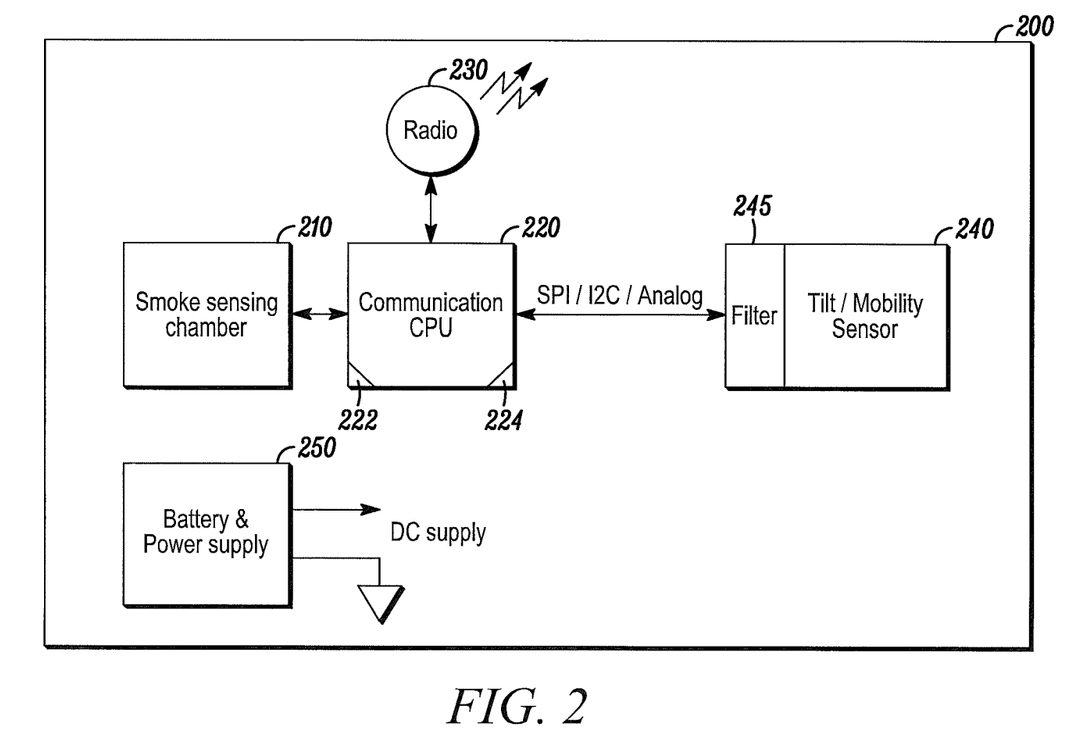
FIG. 2 is a block diagram of a wireless device in accordance with a first embodiment of the present invention.

FIG. 2 is a block diagram of a wireless device 200 that can be used to detect displacement thereof in accordance with the method of FIG. 1. As seen in FIG. 2, the wireless device 200 can include a smoke sensing chamber 210 to receive ambient smoke from the monitored region R. The device 200 is shown and described with a smoke sensing chamber 210. However, it is to be understood that the device 200 need not include a smoke sensing chamber, and instead could include any input or I/O device as would be known by those of skill in the art. For example, the device 200 could include a pull station, a carbon monoxide detector, or a heat sensing chamber. However, for the purposes of discussion, the device 200 will be described as including a smoke sensing chamber 210.

The smoke sensing chamber 210 can be in communication with the communication CPU 220. In embodiments of the present invention, the communication CPU 220 can include a programmable processor 222 and associated executable software stored on a computer readable medium 224.

The communication CPU can also be in communication with a radio 230, and a tilt/mobility sensor 240 and its associated filter 245. The filter 245 can filter noise associated with the device.

In embodiments of the present invention, the radio can be in communication with an alarm system with which the device 200 is associated. The device 200 can be powered by a battery and power supply 250.

The tilt/mobility sensor 240, in association with the communication CPU 220, can detect displacement and tampering of a wireless device 200 in accordance with the present invention. For example, the tilt/mobility sensor 240 could include an accelerometer.

Figure 3A:
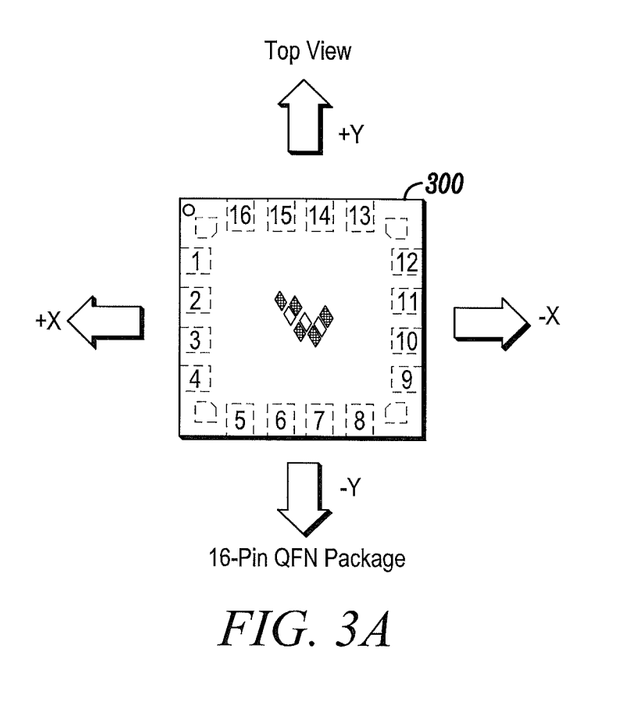
FIG. 3A is a top view of a QFN package included in a processor of a wireless device in accordance with a first embodiment of the present invention.
Figure 3B:
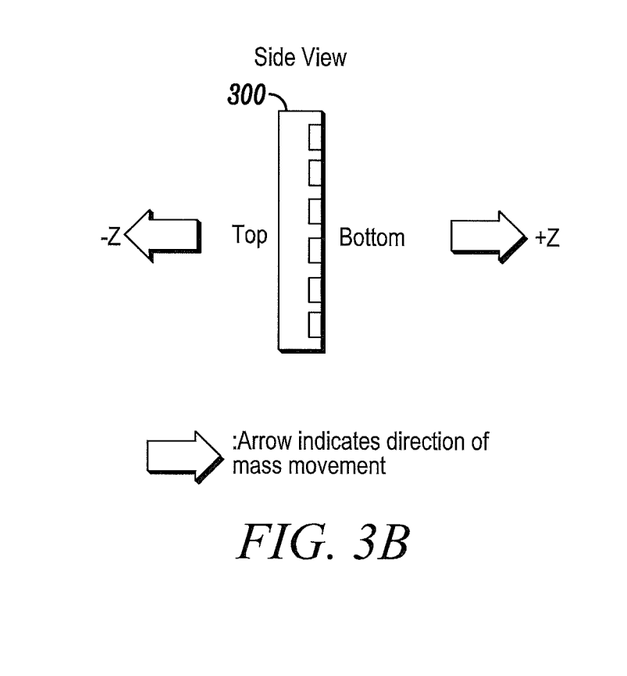
FIG. 3B is a side view of a QFN package included in a processor of a wireless device in accordance with a first embodiment of the present invention.

FIG. 3A is a top view of an exemplary QFN package accelerometer 300 that can be included in a processor of a wireless device, and FIG. 3B is a side view of an exemplary QFN package 300 that can be included in a processor of a wireless device. As seen in FIGS. 3A and 3B, the QFN package 300 can include 16 pins and can detect acceleration in the +X and –X directions, in the +Y and –Y directions, and in the +Z and –Z directions.

In some embodiments of the present invention, the tilt/mobility sensor 240 can include an accelerometer that is a low power, low profile micro-machined accelerometer. In some embodiments, the accelerometer can include a sleep mode, and the accelerometer can be woken up when an event occurs.

As explained above, radio frequency triangulation can also be employed to detect the displacement of a device in embodiments of the present invention. For example, a wireless device used in an alarm system can be equipped with a radio, and the radio can provide received signal strength indicator (RSSI) signals from objects within the vicinity of the device. In embodiments of the present invention, the RSSI signals received by the radio of a device can be used in connection with multi-lateration algorithms to determine when the device is displaced.

Figure 4:
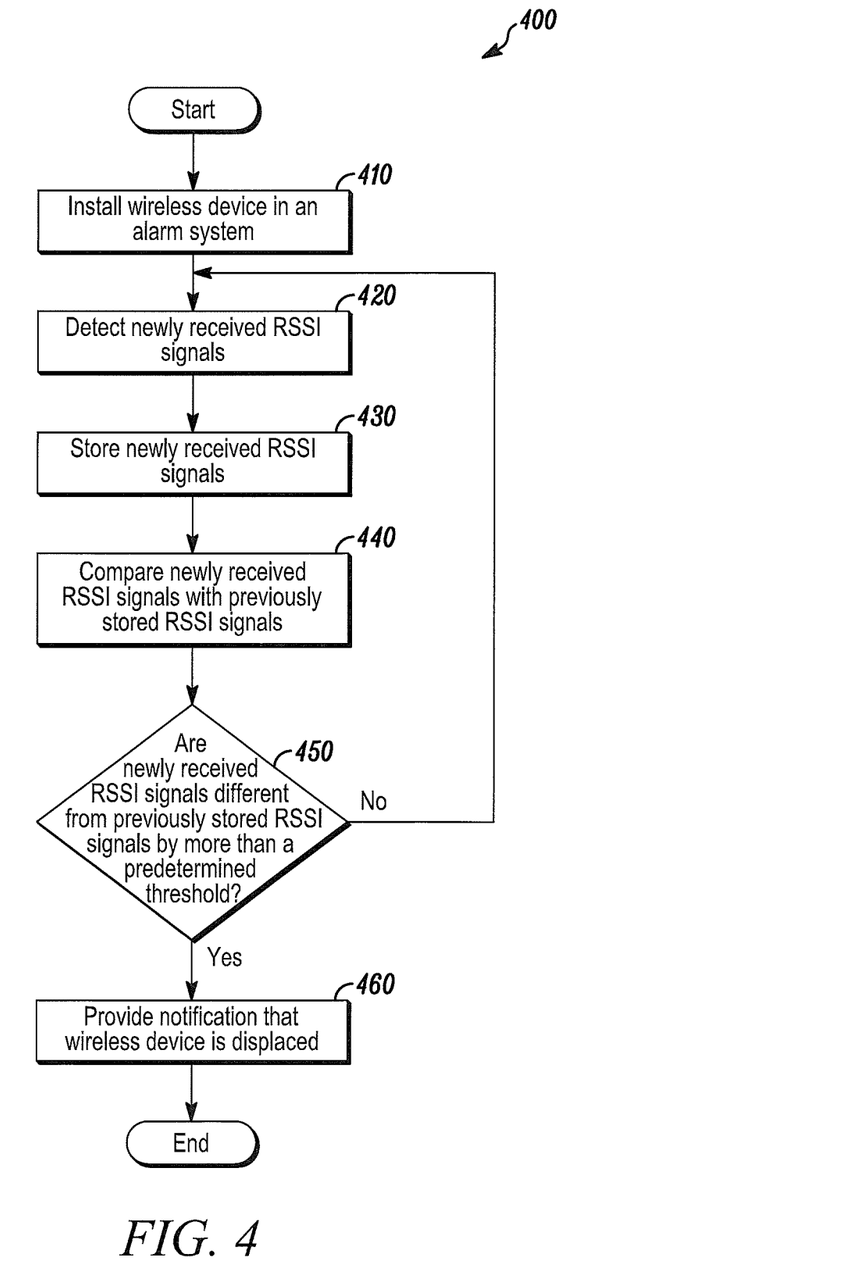
FIG. 4 is a flow diagram of a method of detecting displacement of a wireless device in accordance with a second embodiment of the present invention.

FIG. 4 is a flow diagram of a method 400 of detecting displacement of a wireless device in accordance with a second embodiment of the present invention. In the method 400, a wireless device can be installed in an alarm system as in 410. Then, newly received RSSI signals of the device can be detected as in 420. The newly received RSSI signals can be stored as in 430 and compared to previously stored RSSI signals as in 440.

If the newly received RSSI signals are different from the previously stored RSSI signals by more than a predetermined threshold, then a notification can be provided that the wireless device has been displaced as in 460. However, if the newly-received RSSI signals are the same as or different from the previously stored RSSI signals by less than the predetermined threshold, then the method 400 can continue to receive and store newly received signals.

In accordance with the present invention, the method 400 can detect and store newly received RSSI signals caused by more than one neighboring object. This aids in preventing false movement indications that may otherwise occur due to movement of neighboring objects, for example, the rearrangement of furniture.

In some embodiments of the present invention, the method 400 can also include determining the angle-of-arrive of received signals and/or the time-of-flight of the receive signals. This information can be used with the detected RSSI signals to determine the relative spacing and positioning between objects and devices.

Acoustic ultrasonic ranging can also be employed to detect device displacement and tampering in accordance with the present invention. For example, a wireless device can be equipped with an ultrasonic transducer that can measure acoustic signal strength and reflected propagation delays as well as acoustic signals from other nearby devices. Using these measurements, the device can be capable of detecting both obstructions to sensors and device displacement.

Figure 5:
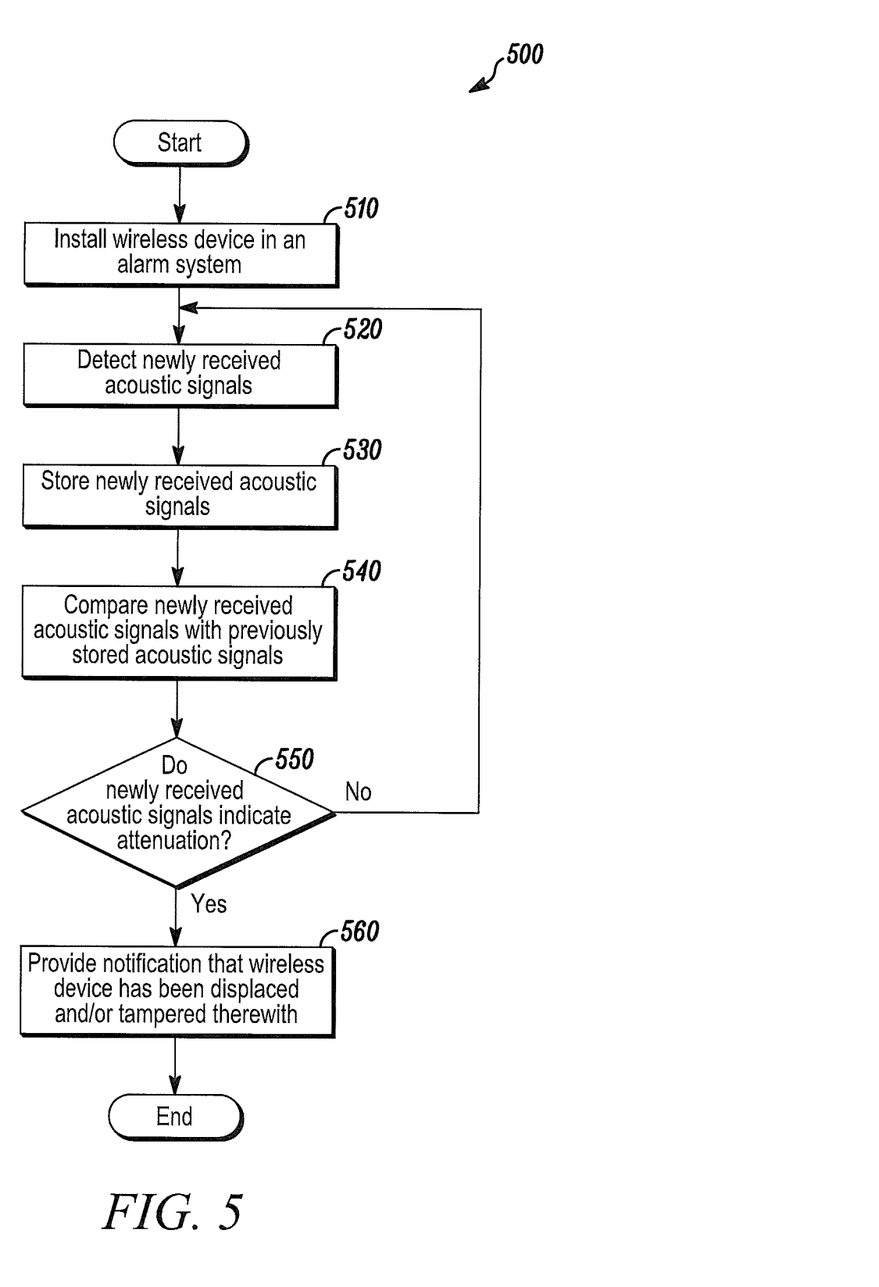
FIG. 5 is a flow diagram of a method of detecting displacement of and tampering with a wireless device in accordance with a third embodiment of the present invention.

FIG. 5 is a flow diagram of a method 500 of detecting displacement and tampering of a wireless device in accordance with a third embodiment of the present invention. In the method 500, a wireless device can be installed in an alarm system as in 510. Then, newly received acoustic signals can be detected as in 520. In embodiments of the present invention, a device can be equipped with a transducer for transmitting and receiving ultrasonic signals.

The newly received acoustic signals can be stored as in 530 and compared to previously stored acoustic signals as in 540. Then, the method 500 can determine if the newly received acoustic signals indicate attenuation from neighboring objects as in 550. If attenuation is not indicated, then the method 500 can continue to detect newly received acoustic signals as in 520. However, if the newly received acoustic signals do indicate attenuation, then the method 500 can provide a notification that the device has been displaced and/or tampered therewith as in 560.

In embodiments of the present invention, the method 400 in FIG. 4 and the method 500 in FIG. 5 can be combined to provide better resolution when determining displacement of or tampering with devices. For example, when RF measurements as in FIG. 4 do not indicate movement, but when acoustic signal measurement as in FIG. 5 indicate attenuation from neighboring devices, systems and methods in accordance with the present invention can indicate that a wireless sensor has been blocked or covered. Similarly, systems and methods of the present invention can indicate a blocked sensor when a reflected signal from one sensor becomes stronger than a signal that is generated without nearby obstructions.

Light ranging can also be employed to detect device displacement and tampering in accordance with the present invention. For example, a wireless device can be equipped with laser ranging technology that can measure changes in distance to walls, neighboring devices, or other fixed objects. Using these measurements, the device can be capable of detecting both obstructions to sensors and device displacement.

Because objects usually move within an occupancy, any single measurement change would not result in a displacement indication. However, individual changes can be incorporated into position data to form a new database of object distances.

Figure 6:
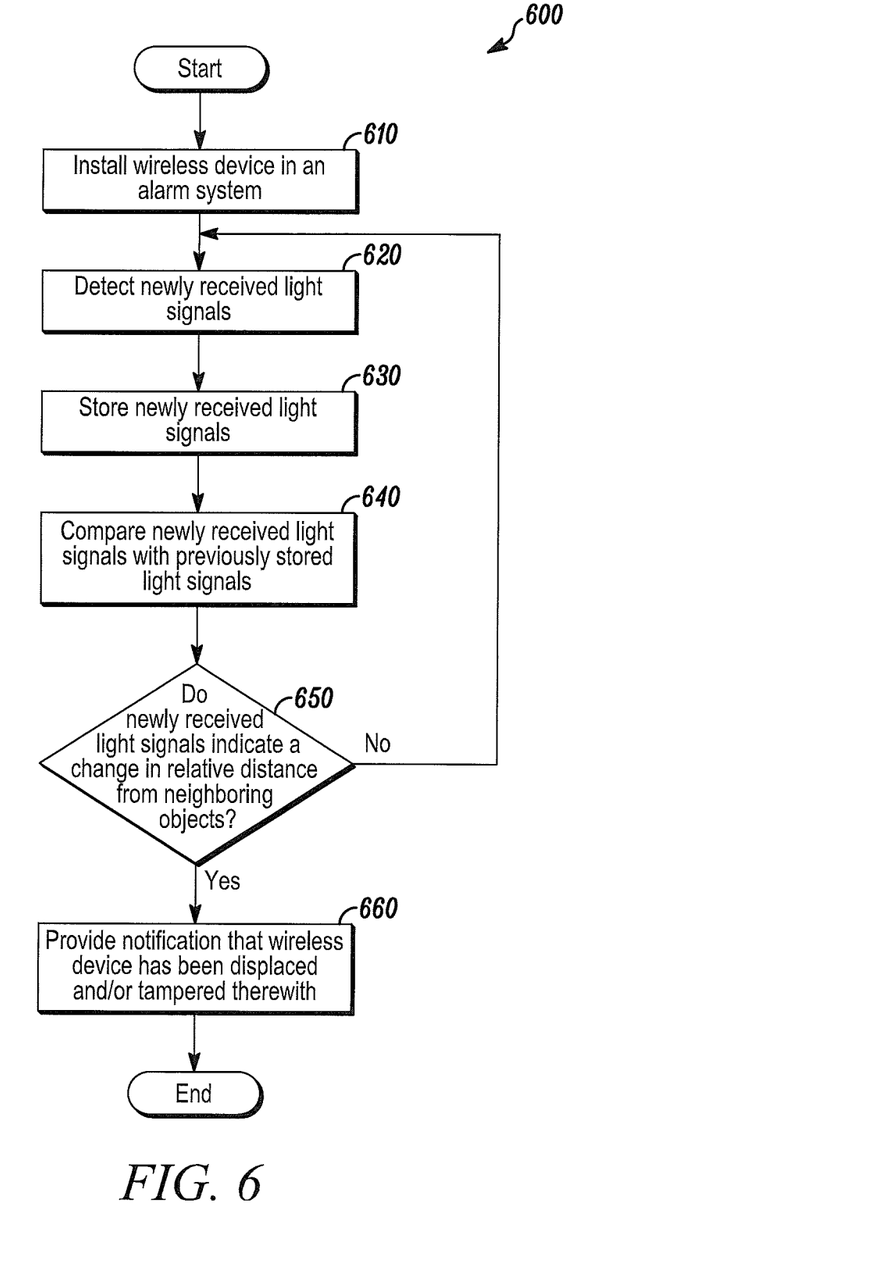
FIG. 6 is a flow diagram of a method of detecting displacement of and tampering with a wireless device in accordance with a fourth embodiment of the present invention.

FIG. 6 is a flow diagram of a method of detecting displacement and tampering of a wireless device in accordance with a fourth embodiment of the present invention. In the method 600, a wireless device can be installed in an alarm system as in 610. Then, newly received light signals can be detected as in 620.

The newly received light signals can be stored as in 630 and compared to previously stored light signals as in 640. Then, the method 600 can determine if the newly received light signals indicate a change in relative distance from neighboring objects as in 650. If a change is not indicated, then the method 600 can continue to detect newly received acoustic signals as in 650. However, if the newly received light signals do indicate a change in relative distance from neighboring objects, then the method 600 can provide a notification that the device has been displaced and/or tampered therewith as in 660.

In embodiments of the present invention, the method 600 in FIG. 6 can be combined with the method 400 in FIG. 4 and/or the method 500 in FIG. 5. Such combinations can provide better resolution when determining displacement of or tampering with devices. For example, when RF measurements as in FIG. 4 do not indicate movement, but when light signal measurement as in FIG. 6 indicate a change in relative distance from neighboring objects, systems and methods in accordance with the present invention can indicate that a wireless sensor has been blocked or covered.

While systems and methods in accordance with the present invention have been shown and described in connection with wireless devices, it is to be understood that the present invention is not so limited. For example, systems and methods in accordance with the present invention can include any type of device, for example, wired devices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described, systems. Other embodiments may be within the scope of the following claims.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A device comprising:
an input device;
a central processing unit in communication with the input device for determining the presence of an ambient condition;
a radio in communication with the central processing unit;

a plurality of tilt/mobility sensors including at least one tilt/mobility sensor included in a processor of the device and in communication with the central processing unit, the at least one tilt/mobility sensor includes a sleep mode and is woken up when an event occurs, wherein each of the tilt/mobility sensors obtains a displacement measurement or signal, and wherein the central processing unit compares the displacement measurement or signal from each of the plurality of tilt/mobility sensors to a respective predetermined value to determine displacement, the comparisons are performed in combination to provide better resolution in determining whether the device is displaced or if a sensor has been blocked or covered.

2. The device of claim 1 further comprising a filter associated with the at least one tilt/mobility sensor for filtering noise detected by the tilt/mobility sensor.

3. The device of claim 1 wherein the at lease one tilt/mobility sensor includes an accelerometer.

4. The device of claim 1 wherein the at least one tilt/mobility sensor and the central processing unit employ acceleration vector analysis to obtain the displacement measurement or signal and to determine whether the device is displaced.

5. The device of claim 1 wherein the at least one tilt/mobility sensor and the central processing unit employ radio frequency triangulation to obtain the displacement measurement or signal and to determine whether the device is displaced.

6. The device of claim 1 wherein the plurality of tilt/mobility sensors and the central processing unit employ acoustic ultrasonic ranging to obtain the displacement measurement or signal and to determine whether the device is displaced.

7. The device of claim 1 wherein the plurality of tilt/mobility sensors and the central processing unit employ light ranging to obtain the displacement measurement or signal and to determine whether the device is displaced.

* * * * *